Patented Nov. 14, 1933

1,934,785

UNITED STATES PATENT OFFICE 1,934,785

BISMUTH SALTS OF ORGANIC CARBOXYLIC ACIDS

Rudolf Berendes, Wuppertal-Sonnborn, and Ludwig Schütz, Wuppertal-Elberfeld, Germany, assignors to Winthrop Chemical Company, Inc., New York, N. Y., a corporation of New York No Drawing. Application March 26, 1931, Serial No. 525,604, and in Germany April 1, 1930

8 Claims. (Cl. 260—11)

The present invention relates to bismuth salts of organic carboxylic acids readily soluble in fatty oils.

In accordance with our invention the bismuth salts of organic carboxylic acids readily soluble in fatty oils are obtainable by reacting upon an organic carboxylic acid of the general probable formula:

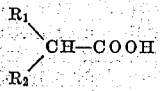

wherein $R_1$ and $R_2$ stand for similar or dissimilar saturated or unsaturated alkyl or alicyclic radicals or for phenyl, or phenylalkyl radicals, with bismuth oxide or bismuth hydroxide, for example, according to the following equation:

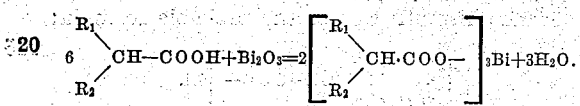

Alternatively, when starting with a salt of the said organic carboxylic acids the reaction takes place, for example, by double decomposition according to the following equation:

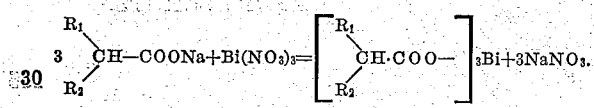

The reaction is performed advantageously while heating, for example, on the water bath and, if desired, in a suitable solvent, for example, water. Depending on the carboxylic acid used as starting material, bismuth salts, for example, of dimethyl acetic acid, methyl-allyl acetic acid, diallyl acetic acid, crotyl-propyl acetic acid, ethyl-isoamyl acetic acid, isopropyl-phenyl acetic acid, methyl-octyl-acetic acid, ethyl-benzyl acetic acid, isobutyl-tolyl acetic acid, ethyl-anisyl acetic acid, dicyclopentyl acetic acid, heptyl-cyclo-hexenyl acetic acid and the like, are obtainable.

The new bismuth salts are very difficultly soluble in water but are distinguished by their solubility in organic solvents and in fatty oils. They decompose with water slowly, more rapidly in the presence of an alkali. Some of the new salts are obtainable in a crystalline form and some in an oily form. Owing to their solubility in fatty oils the new bismuth salts prove suitable in therapeutic use.

The following examples illustrate the invention without restricting it thereto.

Example 1

984 parts by weight of phenylethyl acetic acid are heated to 90–100° C. for several hours while stirring with 559 parts by weight of finely powdered bismuth oxide. In order to remove the water formed in the reaction the mass is dissolved in benzene, the benzene solution separated from the water and filtered and the solvent distilled off from the filtrate advantageously in vacuo, leaving the bismuth salt of phenylethyl acetic acid as a thick viscous oil which is miscible in all proportions with fatty oils. The bismuth content of the compound thus obtained amounts to 30.3%.

Example 2

685 parts by weight of the sodium salt of phenylbutyl acetic acid are dissolved in 1200 parts by weight of water and the solution is mixed with 500 parts by weight of glycerine. In addition 485 parts by weight of crystallized bismuth nitrate are dissolved in 1500 parts by weight of glycerine, 500 parts by weight of water are added and the solution is added to the first solution while vigorously stirring. The reaction product, which separates in an oily form, is washed with warm water several times while shaking, separated from the water, dissolved in benzene and then worked up as in Example 1. The bismuth salt of phenylbutyl acetic acid forms a thick viscous oil which is miscible in all proportions with organic solvents and with fatty oils. The bismuth content of the compound thus obtained amounts to 25.9%.

Example 3

696 parts by weight of diethyl acetic acid are stirred for a few hours at 90–100° C. with 559 parts by weight of bismuth oxide. After working up the reaction mixture as described in Example 1 and distilling off the benzene the bismuth salt of diethyl acetic acid remains as a white crystalline salt which is readily soluble in the customary organic solvents. The bismuth content of the compound thus obtained amounts to 36.3%.

Example 4

504 parts by weight of cyclohexenyl-ethyl acetic acid are stirred for a few hours at 90–100° C. with 312 parts by weight of bismuth hydroxide and the reaction mass is then worked up as indicated in Example 1. The bismuth salt of cyclohexenylethyl acetic acid forms a thick, almost colorless oil which is soluble in organic solvents and in fatty oils.

Example 5

1068 parts by weight of benzylethyl acetic acid are stirred for a few hours at 90–100° C. with 559 parts by weight of finely powdered bismuth oxide and the reaction mass is then worked up as indicated in Example 1. The bismuth salt of benzylethyl acetic acid forms a thick, colorless, viscous oil which is miscible in all proportions with fatty plant and animal oils. The bismuth content of the compound thus obtained amounts to 28.0%.

We claim:—

1. The bismuth salts of the probable formula:

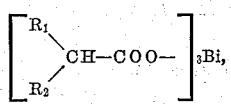

wherein $R_1$ and $R_2$ stand for a hydrocarbon radical of the group consisting of saturated and unsaturated alkyl and alicyclic radicals and of phenyl and phenylalkyl radicals, said salts being crystalline or oily substances, difficultly soluble in water, being suitable for therapeutic use.

2. The bismuth salts of the probable formula:

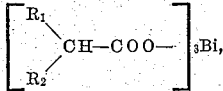

wherein $R_1$ stands for an alkyl group and $R_2$ stands for a hydrocarbon radical of the group consisting of saturated and unsaturated alkyl and alicyclic radicals and of phenyl and phenylalkyl radicals, said salts being crystalline or oily substances, difficultly soluble in water, being suitable for therapeutic use.

3. The bismuth salts of the probable formula:

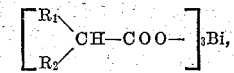

wherein $R_1$ stands for an alkyl group containing up to 4 carbon atoms and $R_2$ stands for a hydrocarbon radical of the group consisting of saturated and unsaturated alkyl and alicyclic radicals and of phenyl and phenylalkyl radicals, said salts being crystalline or oily substances, difficultly soluble in water, being suitable for therapeutic use.

4. The bismuth salts of the probable formula:

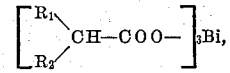

wherein $R_1$ stands for an alkyl group containing up to 4 carbon atoms and $R_2$ stands for an alkyl radical of the group consisting of ethyl and butyl, said salts being crystalline or oily substances, difficultly soluble in water, being suitable for therapeutic use.

5. The bismuth salt of the probable formula:

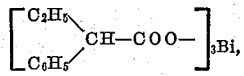

said salt being a viscous oil containing about 30% of bismuth, being insoluble in water, being suitable for therapeutic use.

6. The bismuth salts of the probable formula:

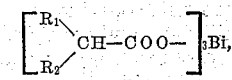

wherein $R_1$ stands for an alkyl group containing up to 4 carbon atoms and $R_2$ stands for an aryl radical of the group consisting of phenyl and benzyl, said salts being crystalline or oily substances, difficultly soluble in water, being suitable for therapeutic use.

7. The bismuth salt of the probable formula:

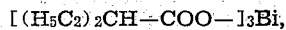

said salt forming white crystals, containing about 36% of bismuth.

8. The bismuth salt of the probable formula:

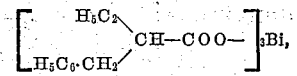

said salt forming a thick colorless viscous oil, containing about 28% of bismuth.

RUDOLF BERENDES.
LUDWIG SCHÜTZ.